United States Patent [19]

Tsugeno et al.

[11] Patent Number: 5,086,399
[45] Date of Patent: Feb. 4, 1992

[54] METHOD AND APPARATUS FOR SETTING-UP ROLLING MILL ROLL GAPS

[75] Inventors: Masashi Tsugeno, Chofu; Makoto Miyashita, Tokorozawa, both of Japan

[73] Assignee: Kabushiki Kaisha Toshiba, Kawasaki, Japan

[21] Appl. No.: 409,727

[22] Filed: Sep. 20, 1989

[30] Foreign Application Priority Data

Sep. 20, 1988 [JP] Japan .................. 63-236052

[51] Int. Cl.$^5$ .................. G01M 7/00; B21B 37/12
[52] U.S. Cl. .................. 364/508; 72/8; 364/469
[58] Field of Search .......... 364/507, 508, 550, 551.01, 364/469, 470; 340/675, 677; 72/8, 10, 11, 15, 16; 73/826, 829

[56] References Cited

U.S. PATENT DOCUMENTS

| | | | |
|---|---|---|---|
| 3,648,494 | 3/1972 | Lautenschlager | 72/8 |
| 4,033,183 | 7/1977 | List et al. | 364/508 |
| 4,037,087 | 7/1977 | Foulds | 235/151.1 |
| 4,151,594 | 4/1979 | Stern | 364/469 |
| 4,323,971 | 4/1982 | Möltner et al. | 364/469 |
| 4,326,257 | 4/1982 | Sata et al. | 364/508 |
| 4,335,435 | 6/1982 | Miura | 364/469 |
| 4,485,497 | 12/1984 | Miura | 364/469 |
| 4,551,805 | 11/1985 | Shimoda et al. | 364/469 |
| 4,719,855 | 1/1988 | Cannon et al. | 364/469 |
| 5,012,660 | 5/1991 | Peterson et al. | 72/8 |

FOREIGN PATENT DOCUMENTS

| | | |
|---|---|---|
| 289064 | 11/1988 | European Pat. Off. |
| 3545769 | 6/1987 | Fed. Rep. of Germany |
| 58-100907 | 6/1983 | Japan |

Primary Examiner—Joseph L. Dixon
Attorney, Agent, or Firm—Foley & Lardner

[57] ABSTRACT

In setting roll gaps of a rolling mill having stands arranged in tandem, the resistance to deformation of a workpiece in each of the stands is calculated on the basis of a cumulative strain in each stand, with strain of the workpiece which is in an entrance side of the mill and in a soaked state being zero. The resistance to deformation of the soaked workpiece is obtained in each stand, so that the accuracy of estimation of the resistance to deformation is improved. Thus, a precise roll gap setting becomes possible, resulting in a product of a thickness accurately coincident with an objective thickness.

4 Claims, 2 Drawing Sheets

F I G. I

METHOD AND APPARATUS FOR SETTING-UP ROLLING MILL ROLL GAPS

FIELD OF THE INVENTION

The present invention relates to a method and apparatus for setting-up a roll gap of a hot strip mill having a coil box or tunnel furnace, etc., on an entrance side of a finishing mill thereof, to obtain a product having a thickness of satisfactory accuracy,

BACKGROUND OF THE INVENTION

In a hot strip mill, the precision of product thickness is very important for the quality of the product. Therefore, thickness control must be achieved. In order to accommodate hot strip mill plants of reduced size and improve their efficiency, it has been considered to introduce a coil box to thereby shorten the overall length of the line and to establish a $F_o$ stand to thereby reduce unit consumption of the roll and prevent the temperature drop.

The set-up of a finishing mill includes estimating the rolling force $P_i^{CAL}$ and calculating the roll gap $S_i$ of each of the mill stands on the basis of the roll force estimation, where $i=1, 2, \ldots, n$, with which gaps and speeds, etc., of the mill stands are set-up in an actual plant. In a case where the estimated rolling force $P_i^{CAL}$ of the mill stand is not coincident with the actual value $P_i^{ACT}$, the accuracy of thickness of a product is lowered. In order to solve this problem, i.e., to make an actual product thickness $h_F^{ACT}$ coincident with objective product thickness $h_F^{AIM}$, it is necessary to make the estimated rolling forces $P_i^{CAL}$ of the mill stand coincident with actual rolling force $P_i^{ACT}$.

In general, the rolling force $P_i^{CAL}$ can be represented by the following equation when there is no tension:

$$P_i^{CAL} = k_{mi} \cdot L_d \cdot B \cdot Q_{pi} \quad \ldots (1)$$

where $k_{mi}$ is a mean resistance to deformation of a workpiece in an i-th stand $F_i$, $L_d$ is length of arc of contact, B is a width of sheet workpiece and $Q_{pi}$ is a rolling force function of the i-th stand $F_i$.

As is clear from the equation (1), the accuracy of the calculated rolling force $P_i^{CAL}$ is determined by the mean resistance to deformation $k_{mi}$ and the rolling force function $Q_{pi}$. The rolling force function $Q_{pi}$ represents the geometrical characteristic of rolling and the mean resistance to deformation $k_{mi}$ represents a physical characteristic of the workpiece. That is, a model of mean resistance of deformation is supplied with a mean temperature $T_i$ of the workpiece under rolling, strain $\epsilon_i$ and strain rate $\dot{\epsilon}_i$ as input parameters and the mean resistance to deformation which is generally influenced largely by the chemical components of steel material. Model equation includes a coefficient table having sections classified with every equivalent equation of component or type of steel, so that a difference in type of steel can be represented.

A basic equation of the mean resistance to deformation model is represented as follows:

$$k_{mi} = k_s^M \cdot k_k^M \quad (2)$$

or $$k_{mi} = k_s^A + k_k^A \quad (3)$$

where $k_s^M$ and $k_s^A$ are static components of mean resistance to deformation and $k_k^M$ and $k_k^A$ are kinematic components. The static components $k_s^M$ and $k_s^A$ are a function of the strain $\dot{\epsilon}_i$ and the temperature $T_i$, and independent of the strain rate $\epsilon_i$. The kinematic components $k_k^M$ and $k_k^A$ are functions of the strain rate $\dot{\epsilon}_i$ and the temperature $T_i$ and independent from the strain $\epsilon_i$ Either the multiplicative equation (2) or the additive equation (3) is on the stress-strain curve of a metal material. The static component $$k_s \left( k \frac{M}{s} \text{ or } k \frac{A}{s} \right),$$

representing the stress-strain curve, is generally represented by the n-th power law of hardening according to work hardening or softening depending upon temperature, strain rate and/or kind of steel, as follows:

$$K_s = C \cdot \epsilon^n \quad (4)$$

where C and n are constants depending upon the kind of steel and the temperature. This equation can represent only the work hardening. In order to represent the work softening, it is sufficient to add a term of difference in strain $\epsilon$ to the equation (4). In this description, since it is based on the n-th power law even considering the work softening, there is no substantial difference.

The resistance to deformation of a finishing stage of a hot strip mill is generally determined by a transformation of the equation (4) into a two-dimensional mean resistance to deformation. That is, $$k_s = 1.15 \cdot C \cdot \epsilon^n \quad (5)$$

For example, the strain $\epsilon_i$ in i-th stand $F_i$ is obtained from the reduction $r_i$ of that stand. The strain is defined in various manner. When defined by Sims' definition which is widely used, it is expressed by $$\epsilon_i = -\ln(1 - r_i) \quad (6)$$

and the reduction $r_i$ of the i-th stand $F_i$ is expressed by $$r_i = (H_i - h_i)/H_i \quad (7)$$

where $H_i$ is the thickness of a workpiece entering into the i-th stand $F_i$ and $h_i$ is the delivery thickness, i.e., the thickness thereof leaving the stand $F_i$.

In this manner, when the reduction ri of each stand $F_i$ is used, the resistance to deformation $k_s$ is calculated from the strain $\epsilon_i$ for every stand $F_i$ as shown in FIG. 2.

This does not cause any severe problem in the case of a hot strip mill having no soaking facility such as a coil box. It is capable of maintaining a constant temperature on the entrance side of the finishing mill since the strain rate with respect to the roughing mill is sufficiently large. However, for a hot strip mill having such a facility, it is impossible to express the thermal effect, and, thus the accuracy of the calculation is not sufficient.

This problem is caused by the assumption that the material enters into the i-th stand $F_i$ with its strain $\epsilon_{(i-1)}$ given by a preceding stand $F_{(i-1)}$ being fully recovered, since the strain $\epsilon_i$ in the finishing mill depends basically upon the thickness of the workpiece on the entrance side of each stand and the delivery thickness thereof. That is, in the mill having a coil box on its entrance side, the material wound in the coil box does not experience any temperature drop due to inter-layer radiation, resulting in a metal structure similar to that annealed by soaking effect and which is supplied to the finishing stand. In the conventional method in which material strain in each stand is used, it is impossible to reflect the influences of the temperature of the material on the side of the coil box facing the entrance side of the finishing mill and the metallurgical structure thereof to the deformation resistance model. Therefore, the accuracy of estimation of the rolling force of the finishing mill becomes insufficient, resulting in a final product thickness which is inaccurately controlled.

As mentioned, in the past, the deformation resistance of the finishing stand is estimated on the basis of the reduction $r_i$ and the strain $\epsilon_i$ without considering the thermal effect of the coil box arranged on the entrance side of the finishing stand. Therefore, the soaking varies with the sheet thickness HR (referred to as transfer bar thickness) during winding in the coil box. It is impossible to express the effect thereof to the rolling force of the finishing stands and it is impossible to handle features of the material of the workpiece to be rolled easily, because the structure thereof has changed in the coil box to one similar to that annealed.

In a mill having a coil box, the effect of the coil box is not reflected effectively to the setting of the finishing mill by calculating the estimated rolling force $P_i^{CAL}$ in each Of the respective finishing stands with respect to a state (temperature, deformation and structure) of the workpiece wound in the coil box. Since, in the prior art, the rolling forces $P_i^{CAL}$ in each of the respective stands are calculated on the basis of the reduction $r_i$ of the stand, and the gap $S_i$ at the stand $F_i$ is set on the basis of the result, $P_i^{CAL}$, of the calculation, the accuracy of thickness of the final product is degraded.

SUMMARY OF THE INVENTION

An object of the present invention is to provide a method and apparatus for setting roll gaps of the finishing mill of a hot strip mill so that the thickness of a final product is precisely controlled even in a case where the hot strip mill is equipped with a coil box.

In order to achieve the above and other objects of the present invention, a roll gap setting apparatus of a rolling mill according to the present invention calculates the cumulative reduction of each stand on the basis of the transfer bar thickness on the entrance side of the rolling mill and the set value of thickness of a workpiece of the stand, calculates the cumulative strain of the workpiece at the stand on the basis of the cumulative reduction and calculates the resistance to deformation of the workpiece at the stand on the basis of the cumulative strain. Then, the roll gap at the stand is set according to the resistance to deformation calculated in this manner.

BRIEF DESCRIPTION OF THE DRAWINGS

In the attached drawings.

DETAILED DESCRIPTION OF THE PREFERRED EMBODIMENT

Figure 1:
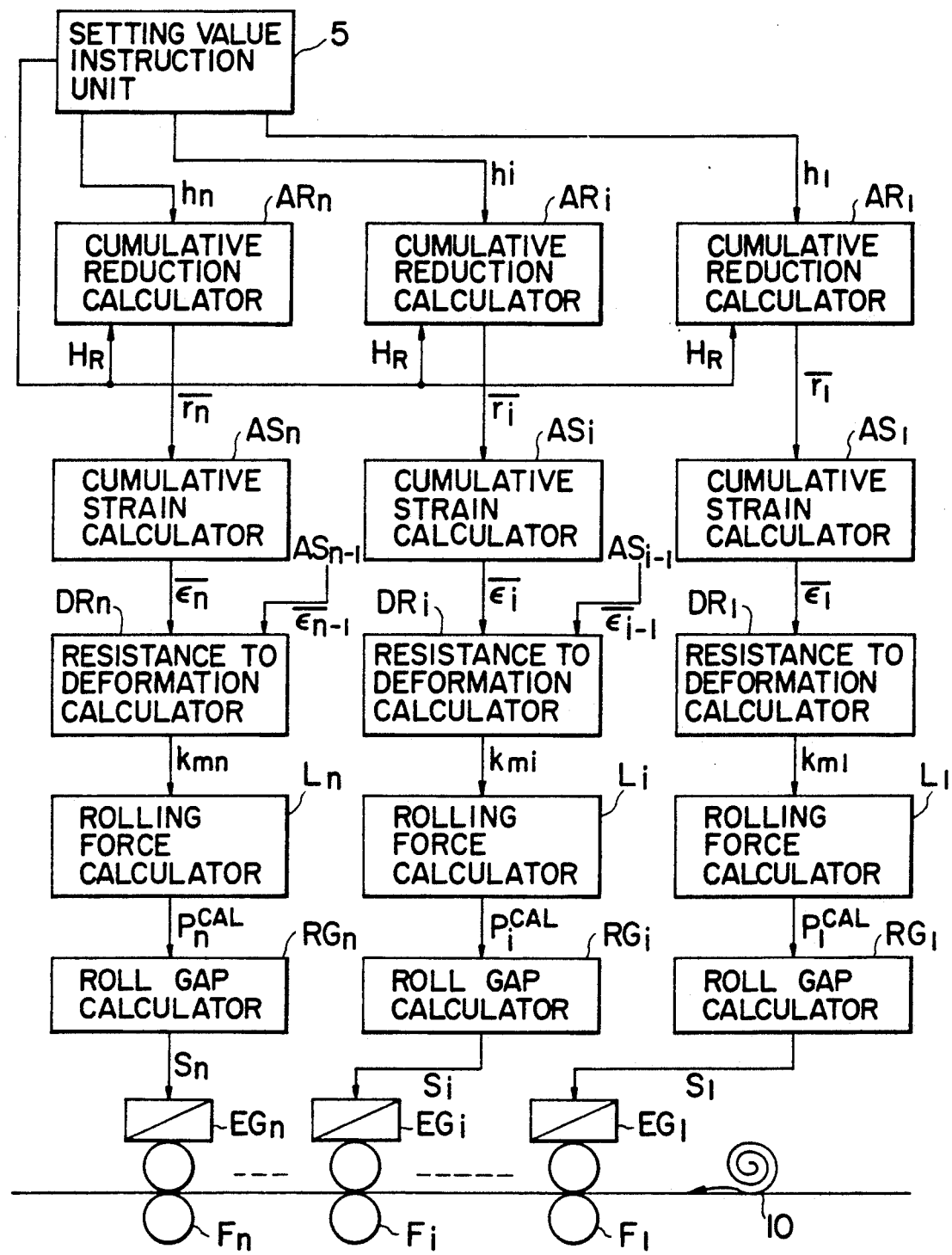
FIG. 1 is a block diagram of a setting device of a rolling mill according to the present invention.
Figure 2:
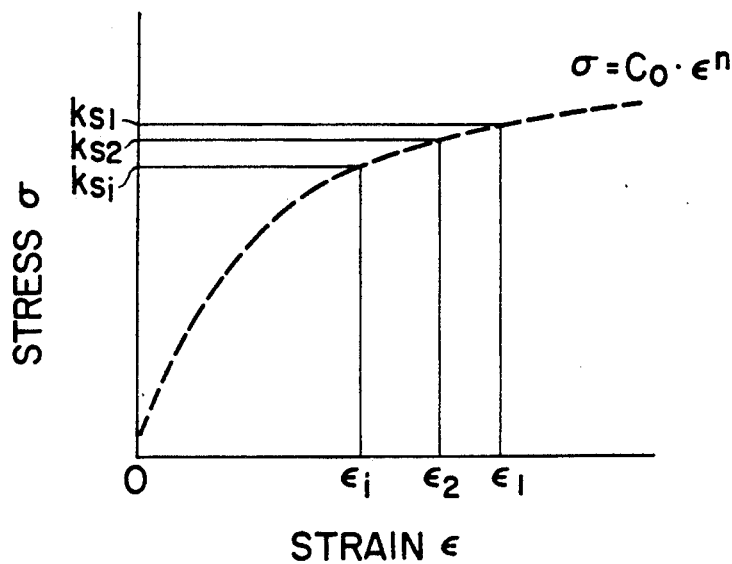
FIG. 2 is a graph of stress-strain curves showing deformation at respective stands.

FIG. 1 shows an embodiment of a setting apparatus of a rolling mill according to the present invention. The setting apparatus is intended for a rolling mill having a finishing mill including a plurality of mill stands $F_1$, $F_2$, ..., $F_n$ arranged in tandem and a coil box 10 arranged on the entrance side of the finishing mill. The setting apparatus includes a setting value instruction unit 5, cumulative reduction calculators $AR_1$, $AR_2$, ..., $AR_n$, cumulative strain calculators $AS_1$, $AS_2$, ..., $AS_n$, resistance to deformation calculators $DR_1$, $DR_2$, ..., $DR_n$, rolling force calculators $L_1$, $L_2$, ..., $L_n$, roll gap calculators $RG_1$, $RG_2$, $RG_n$ and roll gap setting devices $EG_1$, $EG_2$, ..., $EG_n$.

Before describing an operation of the device shown in FIG. 1, the principle of the present invention will be described.

A resistance to deformation $k_{mi}$ of a sheet under rolling is represented, generally, by the basic equations (2) and (3). The static component $k_s$ ($k_s^M$ of the equation (2)) is a function of the strain $\epsilon_i$ and temperature $T_i$ and independent from strain rate $\dot{\epsilon}_i$. The resistance to deformation $k_{mi}$ is often obtained by the following equation:

$$k_{mi} = C \cdot \epsilon_i^n \cdot \dot{\epsilon}_i^m \cdot exp\,(A/T_i) \qquad (8)$$

where C and A are constants depending upon the chemical components in the steel of a workpiece, and given by tables of steel materials or in the form of the equivalent weight of each component, n is strain hardening exponent (n value) and m is rate sensitivity (m value) which is given in this example as a constant for simplicity of explanation, although it depends upon the components in the steel and temperature $T_i$. The transformation to the two dimensional mean resistance to deformation is realized by merely multiplying the equation (8) by 1.15.

The equation (8) uses strain $\epsilon_i$ in each of the respective mill stands $F_i$ and, so, the effect of the soaking facility such as coil box is not considered in this equation. In order to introduce such a soaking effect into the equation (8), cumulative strain $\bar{\epsilon}_i$ based on the transfer bar thickness $H_R$ is used. The cumulative strain $\bar{\epsilon}_i$ is obtained as follows. That is, cumulative reduction $\bar{r}_i$ is represented by $$\bar{r}_i = (H_r - h_i)/H_R \qquad (9)$$

where $h_i$ is thickness of workpiece at a delivery side of the i-th stand. Describing the cumulative strain by Sims' equation, $$\bar{\epsilon}_i = -ln(l - \bar{r}_i) \qquad (10)$$

The two dimensional mean resistance to deformation $k_{mi}$ is obtained by integrating and averaging the equation (10). Expressing equivalent stress—equivalent strain curve of the material by $$\sigma = C_o \cdot \epsilon^n \quad (11)$$

the static component $k_s$ of the two dimensional mean resistance to deformation $k_{mi}$, except the term of temperature, can be calculated by $$k_s = \frac{1}{\bar{\epsilon}_i - \bar{\epsilon}_{i-1}} \cdot \int_{\bar{\epsilon}_{i-1}}^{\bar{\epsilon}_i} \sigma d\epsilon \quad (12)$$

Using this in equation (11) produces the following.

$$\begin{aligned} k_s &= \frac{1}{\bar{\epsilon}_i - \bar{\epsilon}_{i-1}} \cdot \int_{\bar{\epsilon}_{i-1}}^{\bar{\epsilon}_i} C_o \cdot \epsilon^n \cdot d\epsilon \\ &= C_o \cdot \frac{1}{\bar{\epsilon}_i - \bar{\epsilon}_{i-1}} \cdot \left[ \frac{1}{n+1} \cdot \epsilon^{n+1} \right]_{\bar{\epsilon}_{i-1}}^{\bar{\epsilon}_i} \\ &= \frac{C_o}{n+1} \cdot \frac{\bar{\epsilon}_i^{n+1} - \bar{\epsilon}_{i-1}^{n+1}}{\bar{\epsilon}_i - \bar{\epsilon}_{i-1}} \end{aligned} \quad (13)$$

Since the equation (11) corresponds to the equivalent stress - equivalent strain curve, in order to transform it into the principle stress in the rolling direction, it is sufficient to replace the strain $\epsilon_i$ by $2/\sqrt{3}\, \epsilon_i$ ($2/\sqrt{3} = 1.15$). Therefore, in rolling, the equation (13) can be changed to the following equation (14):

$$k_s = C_o \cdot \frac{1}{n+1} \left( \frac{2}{\sqrt{3}} \right)^n \cdot \frac{\bar{\epsilon}_i^{n+1} - \bar{\epsilon}_{i-1}^{n+1}}{\bar{\epsilon}_i - \bar{\epsilon}_{i-1}} \quad (14)$$

Applying this equation to the two dimensional mean resistance to deformation $k_{mi}$ (equation (8)), the following is obtained:

$$k_{mi} = C \cdot \frac{1}{n+1} \cdot \left( \frac{2}{\sqrt{3}} \right)^n \cdot \frac{\bar{\epsilon}_i^{n+1} - \bar{\epsilon}_{i-1}^{n+1}}{\bar{\epsilon}_i - \bar{\epsilon}_{i-1}} \cdot \dot{\epsilon}_i^m \exp\left( \frac{A}{T_i} \right) \quad (15)$$

These equations using cumulative strain $\bar{\epsilon}_i$ are applied practically to some mills in the field of cold rolling. In the present invention, the cumulative strain $\epsilon_i$ of the stand $F_i$ from the transfer bar thickness $H_R$ is used to obtain the resistance to deformation.

Figure 3:
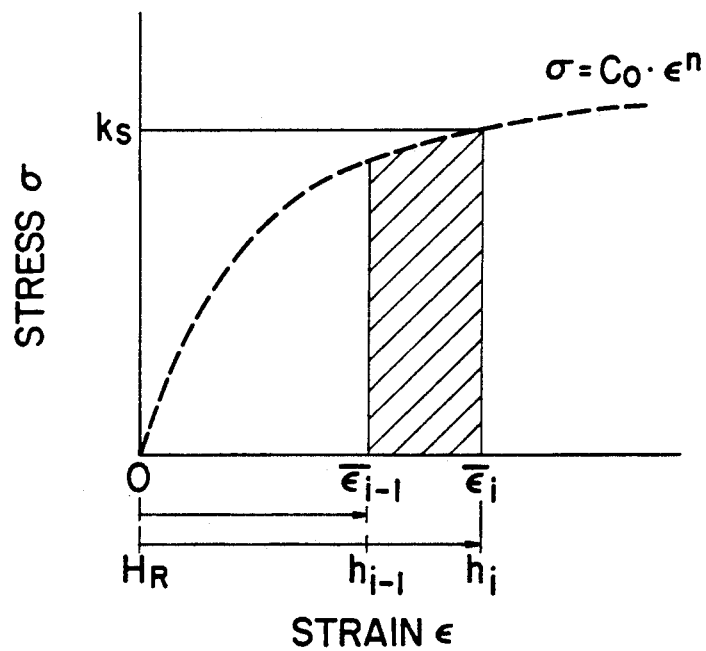
FIG. 3 is a graph showing the relationship of a cumulative strain to a static component of resistance to deformation.

As shown in FIG. 3, in order to obtain the resistance to deformation $k_{mi}$ in the i-th stand $F_i$, the cumulative reduction $\bar{r}_i$ is obtained from the transfer bar thickness $H_R$ and the thickness $h_i$ of the workpiece at the delivery side of the stand $F_i$. The cumulative reduction $\bar{r}_i$ represents an amount of deformation of the workpiece whose initial thickness is the transfer bar thickness experienced up to the delivery side of the stand $F_i$, and the amount of deformation includes the cumulative effect of rolling after the workpiece is wound in the coil box and shows a state where the hardness obtained by strain hardening is not recovered until the workpiece enters into the next stand. For strain $\epsilon$, it is calculated on the basis of a value ($= k_s$) obtained by dividing the resistance to deformation $k_{mi}$ in a period in which the workpiece is rolled down from the entering thickness $h_{i-1}$ of the stand $F_i$, which is equal to a thickness at the exit side of the stand $F_{i-1}$, shown in FIG. 3, to the exit thickness $h_i$ of the stand $F_i$ by a section ($\bar{\epsilon}_i - \bar{\epsilon}_{i-1}$). In this case, since strand $\bar{\epsilon}_i$ and $\bar{\epsilon}_{i-1}$ are calculated by the cumulative reduction $\bar{r}_i$, $\bar{r}_{i-1}$ according to the equation (10), the strain when the workpiece is rolled down from the transfer bar thickness $H_R$ to $h_i$ is $\bar{\epsilon}_i$ and that rolled down to $h_{i-1}$ is $\bar{\epsilon}_{i-1}$, with the strain at the transfer bar thickness being 0. That is, the equation mathematically represents a case where strain $\bar{\epsilon}_i$ is accumulated from a state where the strain of the workpiece, whose thickness is the transfer bar thickness $H_R$ and which is wound in the coil box becomes 0 due to the soaking effect.

In this manner, the resistance to deformation $k_{mi}$ of the workpiece at the respective stands are calculated according to the cumulative strain $\bar{\epsilon}_i$ at the respective stands, on the basis of the case in which the workpiece is wound in the coil box and thus soaked in the entrance side of the finishing mill. Thus, the resistance to deformation $k_{mi}$ at the respective stands includes the consideration of soaked state of the workpiece at the entrance side of the finishing mill. Therefore, the accuracy of estimation of the resistance to deformation is improved, resulting in the precise setting of the roll gap. Thus, it becomes possible to make the product thickness $h_F{}^{ACT}$ precisely coincident with the objective thickness $h_F{}^{AIM}$.

The apparatus shown in FIG. 1 is constructed according to the principle described above. The setting value instruction unit 5 instructs the cumulative reduction calculators $AR_i$ the transfer bar thickness $H_R$ at the entrance side of the first stand $F_1$ of the finishing mill and the exit side thicknesses $h_i$ of the respective stands $F_i$ (i=1, 2, ..., n). The cumulative reduction calculator $AR_i$ calculates the cumulative reduction $\bar{r}_i$ from the transfer bar thickness $H_R$ and the exit side thicknesses $h_i$ at the respective stands $F_i$, according to the equation (9).

The cumulative strain calculator $AS_i$ calculates the cumulative strain $\bar{\epsilon}_i$ from the cumulative reduction $r_i$ according to the equation (10). The first resistance to deformation calculator $DR_1$ calculates the resistance to deformation $k_{m1}$ of the first stand $F_1$ from the cumulative strain $\bar{\epsilon}_1$ according to the equations (8) and (15). The i-th resistance to deformation calculator $DR_i$ (i=2, 3, ..., n) similarly calculates the resistance to deformation $k_{mi}$ of the i-th stand $F_i$ from cumulative strains $\bar{\epsilon}_{i-1}$ and $\bar{\epsilon}_i$ obtained by the (i−1)th and the i-th cumulative strain calculator $AS_{i-1}$ and $AS_i$.

The rolling force calculator $L_i$ calculates the rolling force $P_i{}^{CAL}$ of the stand $F_i$ from the resistance to deformation $k_{mi}$ of the stand $F_i$ according to the equation (1). The roll gap calculator $RG_i$ calculates the roll gap $S_i$ from the rolling force $P_i{}^{CAL}$. The roll gap setting device $EG_i$ sets an actual roll gap of the stand $F_i$ such that the latter becomes the roll gap $S_i$ calculated by the roll gap calculator $RG_i$.

The setting value instruction unit 5 and the respective calculators are easily constructed by means of computer software.

The operation and effect of this embodiment will now be described.

The cumulative reduction $\bar{r}_i$ of the stand $F_i$ is obtained from the transfer bar thickness $H_R$ and the exit side thickness $h_i$ of the stand $F_i$ by the cumulative reduction calculator $AR_i$. The cumulative strain $\bar{\epsilon}_i$ at the exit side of the stand $F_i$ is obtained from the cumulative reduction $\bar{r}_i$ thus obtained, by the cumulative strain calculator $AS_i$. The resistance to deformation $k_{mi}$ of the stand $F_i$ is obtained from the cumulative strain at the exit side of the stand $F_{i-1}$, i.e., at the entrance side of the stand $F_i$, and the cumulative strain at the exit side of the stand $F_i$, by the resistance to deformation calculator $DR_i$. On the basis of the resistance to deformation kmi, the rolling force $P_i^{CAL}$ of the stand $F_i$ is obtained by the rolling force calculator $L_i$ and, on the basis of thus obtained rolling force $P_i^{CAL}$, the roll gap $S_i$ of the Stand $F_i$ is obtained by the roll gap calculator $RG_i$. Then, on the basis of this roll gap $S_i$, an actual roll gap of the stand $F_i$ is set by the gap setting device $EG_i$.

These operations are performed for each of the stands $F_1, F_2, \ldots, F_n$ and, after the roll gaps are set, an actual rolling is performed for an actual workpiece, resulting in a plate having the predetermined thickness. It should be noted, however, that the cumulative strain $\bar{\epsilon}_1$ of the first stand $F_1$ is equal to the strain $\epsilon_1$ thereof since the workpiece is not rolled in the period from the time when it is wound in the coil box with $\bar{\epsilon}_0=0$ to the time when it enters into the stand $F_1$.

In this embodiment, although the calculation of the resistance to deformation $k_{mi}$ is based only on the cumulative strain $\bar{\epsilon}_i$, it may be performed by taking parameters other than the strain $\epsilon_i$, such as temperature $T_i$, strain rate $\dot{\epsilon}_i$ and chemical components, into consideration. The effects of these other parameters are omitted in this description since it is very difficult to describe all of them and the most important effect of the strain $\bar{\epsilon}_i$ may be obscured if these other components were described.

In this embodiment, although the initial setting of the roll gap of the respective stands $F_i$ is performed by using the roll gap $S_i$ obtained from the rolling force $P_i^{CAL}$ calculated from the Cumulative reduction $\bar{r}_i$ and the cumulative strain $\bar{\epsilon}_i$, the effect of improvement of the precision of estimation of the rolling force $P_i^{CAL}$ can also be applied to the setting of other values. For example, in the automatic gauge control (AGC) of a gauge meter type which requires the gradient of plastic curve $m_i$ of the material, the latter is calculated from the rolling force $P_i^{CAL}$ Therefore, the accuracy of AGC is also improved by the improved estimation of the rolling force $P_i^{CAL}$.

As described, with the improvement of estimation accuracy of the rolling force $P_i^{CAL}$, the accuracy of roll gap setting in the respective stands is improved, resulting in a plate having a top end portion whose thickness is well controlled. Furthermore, the accuracy of thickness control and stability thereof for the overall portion of the plate are also improved, resulting in a product of high quality.

Although the rolling mill has been described as having the coil box, the present invention can be also applied with the same effect to other rolling mill such as tunnel furnaces which have soaking facilities such as thermal insulation covers.

What is claimed is:

1. A method of setting roll gaps of a rolling mill including a plurality (n) of tandem-arranged mill stands $F_1, F_2, \ldots, F_n$, comprising a first step of calculating a cumulative reduction $\bar{r}_i$ at each said stand $F_i$ ($i=1, 2, \ldots, n$) from a transfer bar thickness $H_R$ at an entrance side of said rolling mill and a setting thickness $h_i$ at an exit side of each said stand, a second step of calculating a cumulative strain $\bar{\epsilon}_i$ of a workpiece in said stand $F_i$ from said cumulative reduction $\bar{r}_i$, a third step of calculating resistance to deformation $k_{mi}$ of said material in said stand from said cumulative strain $\bar{\epsilon}_i$, a fourth step of calculating a rolling force $P_i^{CAL}$ of said stand $F_i$ from said resistance to deformation $k_{mi}$, a fifth step of calculating an objective roll gap $S_i$ of said stand $F_i$ from said rolling force $P_i^{CAL}$, and a sixth step of setting a roll gap such that an actual roll gap of said stand $F_i$ coincides with said objective roll gap $S_i$.

2. The method as claimed in claim 1, wherein said third step comprises the steps of calculating said resistance to deformation $k_{ml}$ of said workpiece in said first stand $F_1$ from said cumulative strain $\bar{\epsilon}_1$ compared to said first stand $F_1$ and calculating said resistance to deformations $k_{mi}$ of said workpiece in the second and subsequent stands $F_i$ ($i \geq 2$) from said cumulative strains $\bar{\epsilon}_i$ related to said stands $F_i$ and said cumulative strain $\bar{\epsilon}_{i-1}$ related to said stand $F_{i-1}$ preceding said stand $F_i$.

3. An apparatus for setting roll gaps of a rolling mill including a plurality (n) of tandem-arranged mill stands $F_1, F_2, \ldots, F_n$, comprising:

first means for calculating a cumulative reduction $\bar{r}_i$ at each said stand $F_i$ ($i=1, 2, \ldots, n$) from a transfer bar thickness $H_R$ at an entrance side of each said rolling mill and a setting thickness $h_i$ at an exit side of said stand, second means for calculating a cumulative strain $\bar{\epsilon}_i$ of a workpiece in each said stand $F_i$ from said cumulative reduction $\bar{r}_i$, third means ($DR_i$) for calculating a resistance to deformation $k_{mi}$ of said material in each said stand from said cumulative strain calculated by said second means, fourth means for calculating a rolling force $P_i^{CAL}$ of said stand $F_i$ from said resistance to deformation $k_{mi}$, fifth means for calculating an objective roll gap $S_i$ of said stand $F_i$ from said rolling force $P_i^{CAL}$, and sixth means for setting a roll gap such that an actual roll gap of said stand $F_i$ coincides with said objective roll gap $S_i$.

4. The apparatus as claimed in claim 1, wherein said third means calculates said resistance to deformation $k_{ml}$ of said workpiece in said first stand $F_1$ from said cumulative strain $\bar{\epsilon}_1$ compared to said first stand $F_1$ and said resistance to deformations $k_{mi}$ of said workpiece in the second and subsequent stands $F_i$ ($i \geq 2$) from said cumulative strains related to said stands $F_i$ and said cumulative strain $\bar{\epsilon}_{i-1}$ related to said stand $F_{i-1}$ preceding said stand $F_i$.

* * * * *